US009696219B2

United States Patent
Geisler

(10) Patent No.: US 9,696,219 B2
(45) Date of Patent: Jul. 4, 2017

(54) METHOD FOR CALIBRATING A MEASURING DEVICE IN A MOBILE TERMINAL

(71) Applicant: Robert Bosch GmbH, Stuttgart (DE)

(72) Inventor: Dominik Geisler, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 400 days.

(21) Appl. No.: 14/472,142

(22) Filed: Aug. 28, 2014

(65) Prior Publication Data

US 2015/0063402 A1    Mar. 5, 2015

(30) Foreign Application Priority Data

Aug. 29, 2013  (DE) .................. 10 2013 217 230

(51) Int. Cl.
| | | |
|---|---|---|
| *G01K 15/00* | (2006.01) | |
| *G01K 19/00* | (2006.01) | |
| *G01K 13/00* | (2006.01) | |
| *G01K 7/42*  | (2006.01) | |

(52) U.S. Cl.
CPC ......... *G01K 15/005* (2013.01); *G01K 7/427* (2013.01); *G01K 13/00* (2013.01)

(58) Field of Classification Search
None
See application file for complete search history.

(56) References Cited

U.S. PATENT DOCUMENTS

| 2003/0064749 A1* | 4/2003 | Soini ............... H04M 1/21 455/556.1 |
| 2012/0319645 A1* | 12/2012 | O'Donnell ......... H02J 7/025 320/108 |

FOREIGN PATENT DOCUMENTS

EP    1 301 014    4/2003

* cited by examiner

*Primary Examiner* — Erica Lin
(74) *Attorney, Agent, or Firm* — Norton Rose Fulbright US LLP; Gerard Messina

(57) ABSTRACT

A method for calibrating a measuring device in a mobile terminal includes: during a first calibration period, measuring first and second values at the first and second temperature sensors, respectively; during a second calibration period, measuring energy consumption values of the mobile terminal; generating first maximum, first minimum, and first temperature values from the first measured values; generating second maximum, second minimum, and second temperature values from the second measured values; generating a third maximum value from the measured energy consumption values; and storing the first and second temperature values for the calibration if the difference between the first maximum and minimum values and the difference between the second maximum and minimum values are smaller than a threshold value, and the third maximum value is smaller than a further threshold value.

11 Claims, 2 Drawing Sheets

METHOD FOR CALIBRATING A MEASURING DEVICE IN A MOBILE TERMINAL

BACKGROUND OF THE INVENTION

1. Field of the Invention

The present invention relates to a method for calibrating a measuring device in a mobile terminal, and to a mobile terminal having a measuring device that is calibratable in the operating mode.

2. Description of the Related Art

A method is known for deducing the ambient temperature of the mobile terminal on the basis of two temperature sensors that are positioned at different locations in a mobile terminal. Such a method is known, for example, from the published European patent application document EP 1 301 014 A1. It aims to facilitate the measurement of ambient temperature, even when the self-generated heat of the mobile terminal prevents a direct measurement of the ambient temperature. Namely, during operation, individual components of the mobile terminal typically generate heat that is registered by the temperature sensor. Since the temperature sensor cannot be arbitrarily far from the heat source, and in order to disregard the influence of the heat source, it is common practice to ascertain the temperature gradient between two temperature sensors and to extrapolate the ambient temperature, a first temperature sensor typically being configured inside of the mobile terminal, while a second temperature sensor is positioned at an exposed location on the mobile terminal. To improve the accuracy of the measuring device using the two temperature sensors, the integral temperature sensors are calibrated during the production process of the mobile terminal. In order for the calibration process to be carried out within a time frame that is justifiable for the production process of the mobile terminal, the calibration is restricted to two temperatures, without taking the thermal response times into consideration.

BRIEF SUMMARY OF THE INVENTION

It is, therefore, an object of the present invention to improve the calibration of the measuring device using at least two temperature sensors in a mobile terminal in order to further enhance the accuracy of the ambient temperature determination.

The present invention provides a method for calibrating a measuring device in a mobile terminal, such as a cell phone or a tablet. In particular, the measuring device is a measuring device for determining the ambient temperature of the mobile terminal. For the measuring device, the mobile terminal includes a first temperature sensor and a second temperature sensor. The temperature sensors are temperature-dependent resistors and/or temperature diodes, for example. In accordance with the present invention, the mobile terminal additionally includes a means for determining the energy consumption that ascertains the energy consumption of the mobile terminal, and a memory device. For example, the means for determining the energy consumption is a power meter, in particular one that measures the electric power within the mobile terminal. The present invention provides that, in a first method step during a calibration time period, a plurality of first measured values be measured at the first temperature sensor and a plurality of second measured values at the second temperature sensor. Moreover, a plurality of energy consumption values is measured at the means for determining the energy consumption. The present invention provides that a first maximum value, a first minimum value, and a first temperature value be generated from the first measured values, and/or that a second maximum value, a second minimum value, and a second temperature value be generated from the second measured values. The set of all first measured values measured during the calibration time period may be an ensemble including a first maximum value and a first minimum value, for example, and the set of all second measured values measured during the calibration time period may be a second ensemble including a second minimum value and a second maximum value. Alternatively, it is also conceivable that a newly ascertained maximum value replace the preceding maximum value, respectively a re-determined minimum value replace the preceding maximum value, and be stored. The present invention provides that a third maximum value be generated from the plurality of measured energy consumption values. In accordance with the present invention, the first calibration time period and the second calibration time period essentially end simultaneously, thereby typically completing the first method step. The first, second and third measured values recorded during the first method step determine whether the second method step takes place. It is provided in a second method step that the first temperature value for the plurality of first measured values and the second temperature value for the plurality of second measured values be stored in the memory device. The first and second temperature values are understood, for example, to connote mean values and/or the median of the plurality of first or second measured values. However, a first or a second temperature value may also be understood to connote a single element of the plurality of first measured values or second measured values, in particular of the most recently recorded first and second measured values. The present invention provides that it be a precondition for the storing process that both the difference between the first maximum value and the first minimum value, and the difference between the second maximum value and the second minimum value be smaller than a threshold value, and also that the third maximum value be smaller than a further threshold value. In particular, the first threshold value is a threshold temperature, and/or the further threshold value is a threshold power. For example, the threshold value could be 1° C., and the further threshold value could correspond to the product of a thermal resistance of the mobile terminal relative to the ambient environment, and the electric power of the mobile terminal over time. In the following, the term "calibration measured value" is to be used as a generic term for the first temperature value and the second temperature value.

The present invention has the advantage over the related art of making it possible for the calibration, respectively a portion thereof to also be completed following the production process. This advantageously allows a multitude of calibration measured values to be recorded for a wide variety of conditions, whereby the accuracy of the measuring device composed of the temperature sensors, and thus the estimation of the ambient temperature are initially advantageously improved in comparison to the calibration during the production process, where only two temperatures are typically used for the calibration.

One preferred specific embodiment provides for an offset value to be generated relative to the first temperature value as a function of the first and second temperature value; the first temperature value modified by the offset value being used to determine the ambient temperature. The measured values may then be advantageously corrected using the offset value. The offset value is, in particular, constant or dependent on the temperature. The offset value is notably determined by a correction formula, for example by a polynomial.

Another specific embodiment provides that the first method step or the second method step be performed during an operating mode of the mobile terminal. An operating mode is understood to be a standby operation, for example. The calibration may be thereby advantageously improved and/or renewed in this manner over the lifetime of the mobile terminal. In particular, the method for calibrating the measuring device allows multiple measurements during a standby operation. It is also conceivable, however, that the measurements be performed at a comparatively lower, respectively reduced frequency during the standby operation in order to keep the energy consumption of the mobile terminal low. This eliminates the need for a calibration to be carried out on an overly frequent basis, thereby advantageously lowering the energy consumption.

Another specific embodiment provides that the calibration time period and the further calibration time period be selected in a way that allows the calibration time period and the further calibration time period to last for the same amount of time. The calibration method is reduced in this manner by an adjustable parameter that is to be stored, and is thereby advantageously simplified.

Another specific embodiment provides that, in a zeroth method step that precedes the method, further temperature values be stored in the memory device during the production process of the mobile terminal. This enables a set of calibration values, respectively temperature values to already be stored in the memory device, so that a certain multitude of calibration values, respectively temperature values are advantageously attained more rapidly in comparison to the case where the memory device is empty prior to the first implementation of the method according to the present invention. In the case of a calibration, the calibration values may be stored during the production process or as typical sensor data from the temperature sensor. In particular, in the case of the production method, the calibration values may be measured values that are recorded at temperatures which are typically seldom or not at all reached in the operating mode of the mobile terminal.

Another specific embodiment provides that a correction scheme be generated in a third step to estimate the ambient temperature on the basis of the first temperature value and the second temperature value. A correction scheme may mean an interpolation between two or more calibration measured values or a dynamic modeling, for example. In particular, it is provided that the correction scheme be repeated in accordance with the second method step following each recording of a calibration measured value, respectively subsequently to a predetermined number of calibration measured values. This makes it advantageously possible to realize a most accurate and current correction scheme for calibrating the measuring device.

Another preferred specific embodiment provides that the ambient temperature be estimated in a fourth method step using the correction scheme. The most accurate and current possible correction scheme makes it possible to improve the estimation of the ambient temperature over ambient temperature estimations made using a measuring device for whose calibration, only two temperatures were used. This relates, in particular, to the estimation of temperatures that differ significantly from the two temperatures for which the calibration was carried out.

Another specific embodiment provides that the duration of the calibration time period essentially correspond to 1/9 through 9 times, preferably to 1/6 through 6 times, especially to 1/3 through 3 times a temperature-variation time constant of the mobile terminal. This enables the calibration time period to be advantageously adapted to the mobile terminal, whereby the calibration may be implemented as rapidly and accurately as possible. For example, the duration of the calibration time period is the equivalent of half of the temperature time constant.

A further object of the present invention is a mobile terminal having two temperature measuring devices for determining the ambient temperature, the two temperature measuring devices being calibrated using a method as described above. By improving the calibration of the measuring device, the mobile device is able to advantageously estimate the ambient temperature as accurately as possible as a function of the number of calibration values.

Another specific embodiment of the mobile terminal provides that a temperature measuring device be configured at the perimeter of the cell phone. A temperature sensor is thereby advantageously configured at a preferably most exposed possible position on the mobile terminal. At this location, the temperature sensor is the nearest to the ambient temperature, and the ambient temperature estimation is improved.

Other details, features and advantages of the present invention are derived from the drawings, as well as from the following description of preferred exemplary embodiments, with reference being made to the drawings. The drawings merely illustrate exemplary specific embodiments of the present invention that do not limit the essential inventive idea.

DETAILED DESCRIPTION OF THE INVENTION

Figure 1:
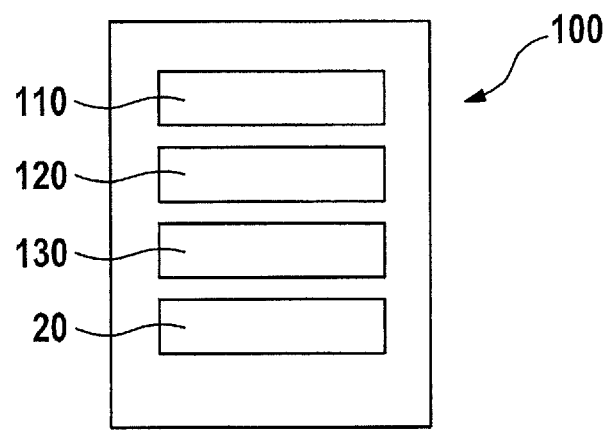
FIG. 1 shows a schematic representation of a mobile device.

In the various figures, equivalent parts are always denoted by the same reference numerals and are, therefore, also typically only named or mentioned once in each case.

FIG. 1 shows a schematic representation of a mobile device. Mobile terminal 100 includes a first temperature sensor 110, a second temperature sensor 120, a means for determining energy consumption 130 and a memory 20.

Figure 2:
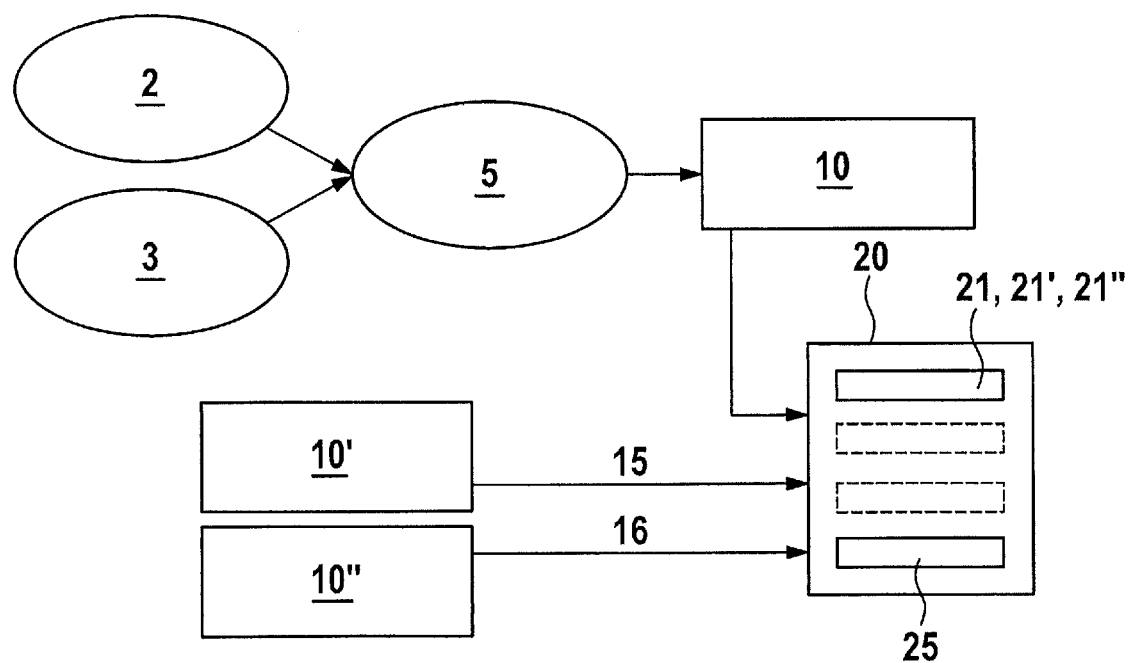
FIG. 2 shows, in a flow chart, the storing of measured values in accordance with a first method step of the method according to the present invention, and, in accordance with a zeroth method step, in an alternative specific embodiment of the method according to the present invention.

In a flow chart, FIG. 2 shows the storing of measured values 21 and 25 in a memory device 20, in accordance with a first method step of the method according to the present invention, and in accordance with a zeroth method step, in a preferred specific embodiment of the method according to the present invention. In accordance with the present invention, the method is directed to improving the conditions for determining the ambient temperature of a mobile terminal, such as a cell phone, respectively, to thereby realize a more accurate determination of the ambient temperature. Memory device 20 is preferably located within the mobile terminal and is either directly or indirectly connected to a first and a second temperature sensor in a way that allows either the measured values of the first and/or the second temperature sensor to be stored in the memory device. To that end, at least one measured value is transmitted in a data flow 15 (for example, via an electrical conduction path or the like) from at least one temperature sensor to memory device 20. It is also conceivable, however, for a processing device to be positioned in the data flow between the temperature sensors and memory device 20; measured values 21 from the first and second temperature sensor being processed in the processing device to form a combined measured value, mostly to generate the difference between the two measured values, and then being fed to memory device 20.

In accordance with the present invention, a first condition 2 and a second condition 3 are fulfilled at the exact moment that the measured values are determined by the first temperature sensor and the second temperature. First condition 2 requires that the energy consumption change by less than a third threshold value during the calibration time period. At a low energy consumption, it may be assumed that the self-generated heating of the mobile terminal increased by the current consumption is low. Such a situation may occur, for example, when the mobile terminal is in an operating mode, but none of the functions thereof are being used. Second condition 3 requires that the measurement temperature at the first temperature sensor and at the second temperature sensor not change by more than a first and a second threshold value. If both conditions are met, a thermally stable state 5 is assumed, i.e., it is assumed that there is no gradient between the first temperature sensors and the second temperature sensors. This assumption justifies a calibration of the first and second temperature sensors during the operating mode of the mobile terminal, i.e., the recording of the first measured value at the first temperature sensors and of the second measured value at the second temperature sensors, respectively the difference between the first measured value and the second measured value. In particular, such a calibration may be repeated for a multitude of temperatures in accordance with the first method step. A multitude of stored measured values 21 and 25 are thereby provided in memory device 20.

Moreover, it is conceivable that original measured values were stored in memory device 20 for calibration purposes in a zeroth method step preceding the first method step; for calibration purposes, these original measured values being supplemented by the measured value obtained in the first method step. In the process, the original measured values may be fed via a further data flow 16 of the memory device, in particular by a calibration during production process 10' of the mobile terminal. Alternatively, typical data 10" of the temperature sensors may also be transmitted to the memory via further data flow 16. To obtain a largest possible ensemble of measured values, it suffices, however, to generate the measured value using the first method step. There is no need to record original measured values and, therefore, it is also conceivable that no further measured values are transmitted to the memory device via the further data flow.

Figure 3:
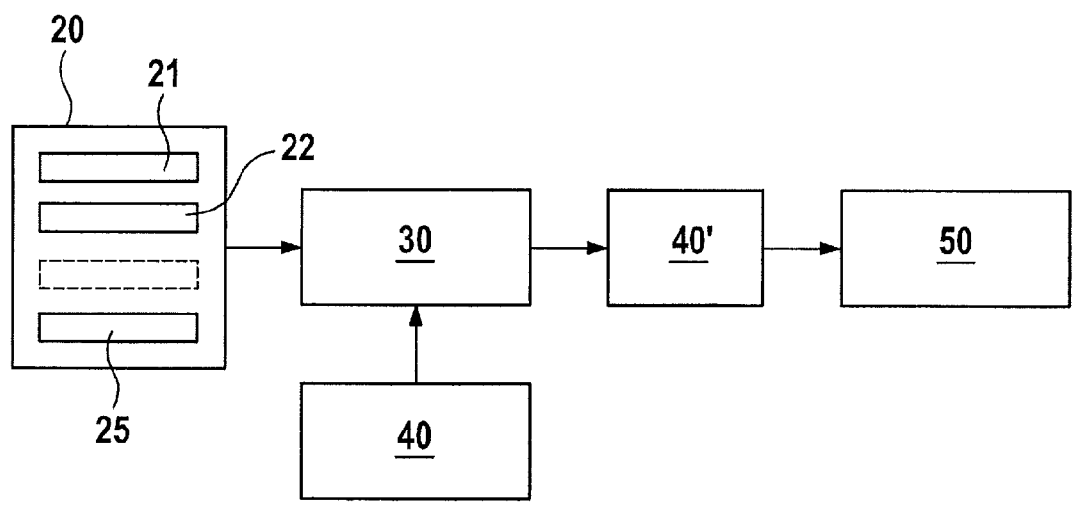
FIG. 3 shows, in a flow chart, the determination of the ambient temperature using a second and third method step.

In a flow chart, FIG. 3 shows how the stored measured values, respectively the differences among the measured values, may be used to improve the ambient temperature estimation by the mobile terminal. It is provided in this context that a correction formula 30 be devised on the basis of the stored measured values. Correction formula 30 may be a polynomial or an interpolation, for example. Using the polynomial, respectively the interpolation, it is possible to initially correct recorded measured values 40 at the first and the second temperature device to determine the ambient temperature. Corrected measured values 40' obtained may then be used for determining ambient air temperature 50.

What is claimed is:

1. A method for calibrating a measuring device in a mobile terminal, the mobile terminal having a first temperature sensor, a second temperature sensor, a determination unit for determining the energy consumption of the mobile terminal, and a memory device, the method comprising:
   in a first method step, performing the following:
      during a first calibration time period, measuring a plurality of first measured values at the first temperature sensor and measuring a plurality of second measured values at the second temperature sensor;
      during a further calibration time period, measuring a plurality of energy consumption values of the mobile terminal at the determination unit, wherein the first calibration time period and the further calibration time period overlap;
      generating a first maximum value, a first minimum value, and a first temperature value from the plurality of first measured values;
      generating a second maximum value, a second minimum value, and a second temperature value from the plurality of second measured values; and
      generating a third maximum value from the measured energy consumption values; and
   in a second method step, storing the first temperature value and the second temperature value in the memory device for calibration of the measuring device if (i) both the difference between the first maximum value and the first minimum value, and the difference between the second maximum value and the second minimum value, are smaller than a threshold value, and (ii) the third maximum value is smaller than a further threshold value.

2. The method as recited in claim 1, wherein:
   an offset value is generated relative to the first temperature value as a function of the first and second temperature values; and
   the first temperature value modified by the offset value is used to determine the ambient temperature.

3. The method as recited in claim 2, wherein at least one of the first method step and the second method step is performed during an operating mode of the mobile terminal.

4. The method as recited in claim 2, wherein the first calibration time period and the further calibration time period are equal in length.

5. The method as recited in claim 2, further comprising:
   in a method step prior to the first method step, storing further temperature values in the memory device during the production process of the mobile terminal.

6. The method as recited in claim 2, further comprising:
   in a third method step, generating a correction scheme, wherein the ambient temperature is estimated using the correction scheme.

7. The method as recited in claim 2, wherein the duration of the calibration time period is selected to essentially correspond to 1/9 through 9 times a temperature-variation time constant of the mobile terminal.

8. A mobile terminal, comprising:
   a first temperature sensor;
   a second temperature sensor;
   a determination unit for determining the energy consumption of the mobile terminal; and
   a memory device;

wherein the temperature sensors and the memory device are configured to enable calibration of at least one of the first and second temperature sensors according to the method of claim 1.

9. The mobile terminal as recited in claim 8, wherein the mobile terminal is a cell phone, and wherein at least one of the first and second temperature sensors is provided at the perimeter of the cell phone.

10. The method as recited in claim 1, wherein the first calibration time period and the further calibration time period end simultaneously.

11. A method for calibrating a measuring device in a mobile terminal, the measuring device including a first temperature sensor and a second temperature sensor, and the mobile terminal further including a processing device, a memory device, and an energy consumption sensor for determining an energy consumption of the mobile terminal, the method comprising:

during a calibration time period:
obtaining a first plurality of temperature measurements using the first temperature sensor;
obtaining a second plurality of temperature measurements using the second temperature sensor; and
obtaining a plurality of energy consumption measurements using the energy consumption sensor;

generating, by the processing device, a first calibration temperature value based on the first plurality of temperature measurements;

generating, by the processing circuitry, a second calibration temperature value based on the second plurality of temperature measurements;

comparing, by the processing device, the first plurality of temperature measurements to each other to identify which of the first plurality of temperature measurements is a maximum of the first plurality of temperature measurements and which of the first plurality of temperature measurements is a minimum of the first plurality of temperature measurements;

comparing, by the processing device, the second plurality of temperature measurements to each other to identify which of the second plurality of temperature measurements is a maximum of the second plurality of temperature measurements and which of the second plurality of temperature measurements is a minimum of the second plurality of temperature measurements;

determining, by the processing device, a first temperature measurement difference that is a difference between the identified maximum of the first plurality of temperature measurements and the identified minimum of the first plurality of temperature measurements;

determining, by the processing device, a second temperature measurement difference that is a difference between the identified maximum of the second plurality of temperature measurements and the identified minimum of the second plurality of temperature measurements;

the processing device comparing, in a first threshold comparison step, the first and second temperature measurement differences to at least one predefined threshold temperature difference;

comparing, by the processing device, the plurality of energy consumption values to each other to identify which of the plurality of energy consumption values is a maximum of the plurality of energy consumption values;

comparing, by the processing device in a second threshold comparison step, the identified maximum of the plurality of energy consumption values to a predefined threshold energy consumption value; and responsive to satisfaction of a condition that the first and second temperature measurement differences are not greater than the at least one predefined threshold temperature difference and the identified maximum of the plurality of energy consumption values is not greater than the predefined threshold energy consumption value, the processing device generating, and storing in the memory device for use to correct future temperature measurements of the measuring device, a correction formula, wherein the generation of the correction formula is performed using the first and second calibration temperature values and the satisfaction of the condition is determined based on results of the first and second threshold comparison steps.

* * * * *